Patented Nov. 29, 1932

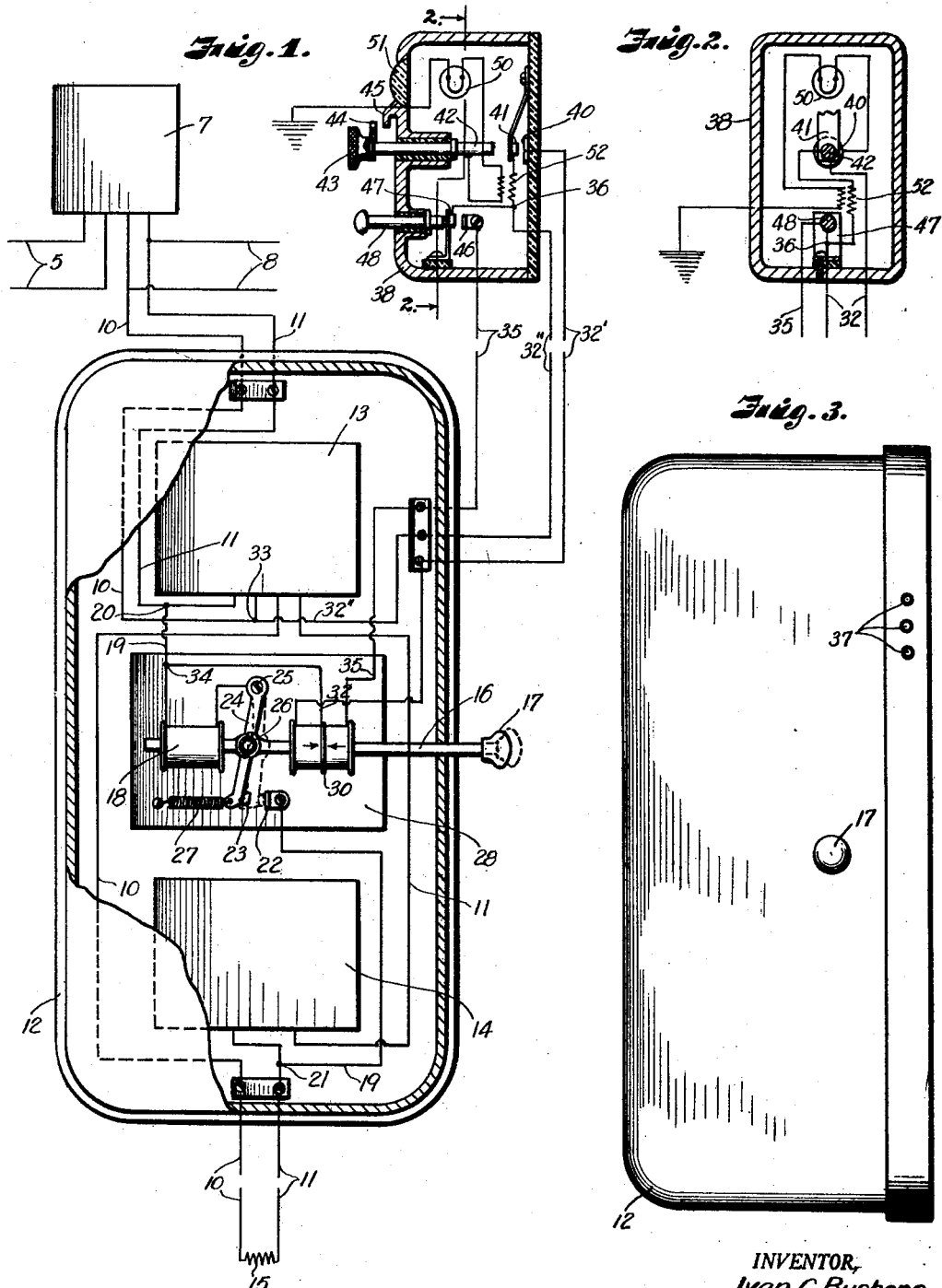

1,889,632

UNITED STATES PATENT OFFICE

IVAN C. BUSHONG, OF LAWRENCE, KANSAS, ASSIGNOR OF THREE-FIFTHS TO HENRY H. KUHN AND ONE-FIFTH TO HAROLD HOWERY, BOTH OF KANSAS CITY, MISSOURI

MULTIPLE RATE METER

Application filed February 21, 1931. Serial No. 517,511.

This invention relates to electric current meter devices, and the primary object of my invention is to provide an improved metering and controlling construction which will enable users of electric equipment to take advantage of concessions offered in the way of rates charged for current based on differential rates established to suit varying current demands for different periods of operation. For this purpose a time-switch is employed by which use of the current at a special or preferential rate is permitted only during the particular times for which the switch is set.

In this connection the invention comprises novel means whereby, at the will of the user of the equipment, he may at any time operate the controlled circuit through a suitable by-pass circuit arrangement enabling the current supply to be continued to the point of use, though measured by the regular service meter for billing at the regular or standard rate. A further object in this connection is to provide convenient means for the control of the by-pass circuit arrangement either locally at the device itself or at whatever point for remote control may be chosen for the purpose. The means referred to makes provision for throwing the by-pass circuit features either into or out of operation, at will, as well as for maintaining the by-pass circuit switch closed, if desired, regardless of interruptions in the circuit which may take place, due to other switches in the circuit.

A primary feature of the invention is also the provision of an equipment comprising the above features, the principal operating elements of which may all be assembled compactly as a unit within a single substantial case adapted to be locked or sealed, whereby the labor and expense attached to the manufacture, assembly and installation of the equipment is reduced to a minimum.

With the foregoing general objects in view, as well as various minor features hereinafter referred to, the invention will now be described by reference to the accompanying drawing illustrating one form of embodiment of the proposed improvements, after which those features and combinations regarded as novel will be particularly set forth and claimed.

In the drawing—

Figure 1 is a face view of a meter and control device constructed in accordance with my invention, with a portion of the front of the case broken away, and illustrating a sectional detail of the remote control devices;

Figure 2 is a sectional detail view of a switch, representing a section on the line 2—2 of Figure 1; and Figure 3 is a side view of the unit.

Referring to the drawings in detail, these illustrate my improvement in relation to an electric supply circuit consisting of the electric wires 5, leading to a regular service meter 7, for metering the current supplied to a house circuit comprising the wires 8, and 10 and 11, representing the circuit to be controlled by the device of my invention. The esential elements comprising this device are all housed within a metal or other substantial case 12 containing a watt-hour meter 13 for measuring the current so long as it is permitted to pass through this circuit by the action of a time switch device (indicated generally by the reference numeral 14) installed in one branch of said circuit 10, 11. Outside the case 12 the wires 10, 11 are extended on to the point of use of the current, which may be a water heater 15 or any other desired form of current consuming appliance.

Without other provision, the current could be used at 15 only at those periods permitted by the closing of the circuit through the action of the automatic time switch 14, representing the periods of time selected for the rate differential. Hence, if it should be desired to use the current at 15 at other times, it is necessary to provide a circuit around the switch 14, for which purpose I provide both local and remote control devices operating a switch intermediate the meter 13 and switch 14, as illustrated in Figure 1. The local control device comprises an operating rod 16 having an exterior knob 17, part of which rod 16 is extended as a core within a series solenoid coil 18 which is included in a by-pass circuit 19 extending from tap point 20 to tap point 21 in said circuit branch 11.

This by-pass circuit also includes a fixed contact element 22 and movable switch contact 23 carried by an arm or lever 24 having a fixed pivot at 25 and insulated pivot connection 26 (with some play) with rod 16, and also a coil spring 27 attached to its free end and acting normally to retract said arm for disengagement of the contacts 22, 23. These parts are carried by an insulating block 28, and the coil 18 is so designed as, when energized, to counteract the pull of the spring 27 for the purpose of maintaining the by-pass circuit 19 closed until the rod is operated to open the circuit either locally and manually, or by the remote control circuit hereinafter described.

For remote control operation, a multiple solenoid 30 is provided, through which passes the rod 16, both coils of which solenoid are connected by a wire 32 to tap point 34 on wire 19, and the circuit arrangement is such that one of the coils is in a closing circuit comprising the wires 11, 19, 32, and the wires 32′ and 32″ (including a switch hereinafter described) leading to a tap 33 on wire 10, and said coil being so designed as, when energized, to actuate the rod 16 in a direction to impart circuit-closing movement to the arm 24 and to maintain the by-pass circuit 19 closed.

The other coil of said solenoid 30 is in an opening circuit comprising the wires 11, 19, 32 and the wire 35 provided with a switch hereinafter referred to and a tap connection 36 to wire 32″ as shown, and said coil being so designed as, when energized, to impart an opposite or circuit-breaking movement to said rod 16.

All the foregoing equipment is compactly installed in the metal case 12, while the remaining control elements are located at any desired remote point for operation, for which purpose the circuit wires 32′, 32″ and 35, are extended through openings 37 in the case 12 to an appropriate box 38, which is provided with a set of any approved form of push-button controls. The closing circuit wires 32′ and 32″ are illustrated as provided with fixed and movable contacts 40 and 41, respectively, adapted to be closed by an insulated push-rod 42 carrying an exterior fiber knob 43, which operates to close the by-pass circuit 19, as already explained. If desired, the rod 42 may be latched in this circuit-closing position by engagement of a projection 44 on the knob 43 with a catch 45 on the box 38, thereby maintaining said circuit 19 closed regardless of the action of the coil 18. The opening circuit wires 32″ and 35 are also provided with fixed and movable contacts 46 and 47, respectively, adapted to be closed by push-rod 48, by which said circuit may be closed for the purpose of opening the by-pass circuit 19 whenever desired. The box 38 may be provided with a pilot light 50 opposite a window 51, and energized by a transformer 52 in the circuit 32, as an indicator of the condition of this circuit.

In operation, the controlled circuit 10—11 may be either single phase or three phase as desired, for which purpose it is only necessary to construct the time switch 14 with as many poles as required to accommodate the number of branch wires 11 employed for service.

Whenever it is desired to use the current in the controlled circuit at other times than that permitted by the operation of the time switch 14, the current is made available by operation of the local control, on pulling out the rod 16 to close the switch contacts 22, 23, as indicated by the dotted lines in Figure 1. This shunts the current through the by-pass circuit 19 and energizes the solenoid 18, which thereafter maintains said circuit closed against the action of the spring 27. The current thus used is by-passed around the auxiliary meter 13, and hence is measured only by the regular service meter 7, and not by said auxiliary meter 13 as a part of the energy to which the preferential rate applies. The by-pass circuit can be opened at any time by pushing in the rod 16, or the circuit will be automatically opened if the controlled circuit is opened at any exterior point, which will of course interrupt the circuit through the solenoid coil 18 and allow the spring 27 to retract the arm 24 and thereby disengage the contacts 22, 23. For the remote control operation, the same results are accomplished by momentarily pushing in the rod 42, causing the closing circuit 32 through the solenoid 30 to actuate the rod 16 to close the by-pass circuit 19, which is thereafter maintained closed by the solenoid 18 so long as the circuit 19 is not opened at some other exterior point which would have the same effect of deenergizing the solenoid 18 and opening the contacts 22, 23, as just referred to. If desired, the push-rod 42 may be latched by the elements 44, 45, to maintain the circuit 32 closed regardless of such fluctuations in the action of the solenoid 18, and thus render the current available in the controlled circuit 10, 11, until the push-rod 42 is released to open the circuit 32. The opening of the by-pass circuit may be effected at any time by operating the push-rod 48 to energize the opening circuit 35 and corresponding coil of relay 30, thereby actuating rod 16 to open the contacts 22, 23.

From the foregoing, it is apparent that a practical, simple and efficient device is provided whereby all the equipment for controlling and measuring the electric energy to be rendered available to the consumer at a preferential rate (or at a discount or premium) during certain periods of plant operation, may be safely and compactly housed within a sealed metallic case and installed as a compact unit at any desired place upon the user's premises, and adjacent to the appliance or appliances using the current, and at the same time the patron, while deriving all the benefits afforded by the preferential rate for current used as limited by the time switch feature, may also make unrestricted use of the current at all other times, at the regular or standard rate, by operation of the by-pass controls, since the current used at these times is measured and registered only by the regular service meter 7, as already explained.

While I have illustrated and described what is now regarded as the preferred and most practical form of embodiment of the invention, it is apparent that the same is susceptible of various changes and modifications within the spirit and principle of my improvements, and I therefore desire to be understood as reserving the right to such variations as fall within the scope of the appended claims.

What I claim is:

1. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, and a local switch device for opening and closing said by-pass circuit.

2. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, and a manually operable and normally open local switch for controlling said by-pass circuit and provided with a solenoid coil energized by the by-pass current and acting to maintain said by-pass circuit closed.

3. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, a switch device for opening and closing said by-pass circuit, and remote control means electrically connected with said tap circuit and operable to actuate said switch device to close said by-pass circuit.

4. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, a switch device for opening and closing said by-pass circuit, and remote control means electrically connected with said tap circuit and operable to actuate said switch device to open said by-pass circuit.

5. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time switch controlling the circuit through said auxiliary meter, a by-pass circuit around said switch and auxiliary meter, a normally open switch for controlling said by-pass circuit and provided with a solenoid coil energized by the by-pass current and acting to maintain said by-pass circuit closed, and remote control means independent of said by-pass circuit and operable to control said by-pass switch independently of said solenoid coil.

6. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, a normally open switch for controlling said by-pass circuit, a manually operable rod for actuating said local switch to close the by-pass circuit, and a solenoid coil energized by the by-pass current and acting upon said rod to maintain the by-pass circuit closed.

7. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, a normally open switch for controlling said by-pass circuit, a manually operable rod for actuating said local switch to close the by-pass circuit, and an independently excited relay coil acting upon said rod and operated by remote control for imparting movement to said rod and actuating said by-pass switch.

8. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit through said auxiliary meter, a by-pass circuit around said switch and auxiliary meter, a normally open switch for controlling said by-pass circuit, a manually operable rod for actuating said local switch to close the by-pass circuit, and an independently excited differential relay acting upon said rod and operated by remote control for actuating said rod to either open or close said by-pass circuit.

9. A metering and controlling device of the character described comprising, in combination with a tap circuit including an auxiliary meter and time-switch controlling the circuit through said meter, a by-pass circuit around said switch and meter, a normally open switch for controlling said by-pass circuit, a manually operable rod for actuating said local switch to close the by-pass circuit, a solenoid coil energized by the by-pass current and acting upon said rod to maintain the by-pass circuit closed, and an independently excited solenoid coil acting upon said rod and operated by remote control for closing and maintaining said by-pass circuit closed independently of said first coil.

10. A metering and controlling device of the character described comprising, in combination with a tap circuit including an auxiliary meter and time-switch controlling the circuit through said meter, a by-pass circuit around said switch and meter, a normally open switch for controlling said by-pass circuit, a manually operable rod for actuating said local switch to close the by-pass circuit, a solenoid coil energized by the by-pass current and acting upon said rod to maintain the by-pass circuit closed, and an independently excited differential relay acting upon said rod and operated by remote control for actuating said rod to either open or close the by-pass circuit independently of said solenoid coil.

11. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit therethrough, a by-pass circuit around said switch and auxiliary meter, a switch included in said by-pass circuit, and means responsive to the current flowing through said by-pass circuit for maintaining said switch in closed position.

12. Individual consumers' multiple rate metering equipment comprising, in combination with the consumer's distributing circuit, a standard rate meter for metering all the current supplied to the consumer through said circuit, a tap circuit supplied with current after passing through said meter, said tap circuit being provided with an auxiliary special rate meter and time-switch controlling the circuit therethrough, a by-pass circuit around said switch and auxiliary meter, and a combination manually and electrically operable switch forming part of said equipment for controlling said by-pass circuit.

In witness whereof I hereunto affix my signature:

IVAN C. BUSHONG.